(12) United States Patent
Ishikawa et al.

(10) Patent No.: US 10,821,997 B2
(45) Date of Patent: Nov. 3, 2020

(54) VEHICLE CONTROL APPARATUS FOR SWITCHING FROM A MANUAL DRIVE MODE TO SELF-DRIVE MODE

(71) Applicant: Honda Motor Co., Ltd., Tokyo (JP)

(72) Inventors: Hisashi Ishikawa, Wako (JP); Masayuki Sadakiyo, Wako (JP); Tomoyuki Noguchi, Wako (JP); Takashi Adachi, Wako (JP); Yusuke Yoshimura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 63 days.

(21) Appl. No.: 16/252,242

(22) Filed: Jan. 18, 2019

(65) Prior Publication Data
US 2019/0225237 A1 Jul. 25, 2019

(30) Foreign Application Priority Data
Jan. 24, 2018 (JP) .................. 2018-009758

(51) Int. Cl.
*B60W 50/12* (2012.01)
*G05D 1/00* (2006.01)
*B60W 10/04* (2006.01)
*B60W 10/10* (2012.01)
*B60W 50/038* (2012.01)
(Continued)

(52) U.S. Cl.
CPC .......... *B60W 50/12* (2013.01); *B60W 10/04* (2013.01); *B60W 10/10* (2013.01); *B60W 30/00* (2013.01); *B60W 30/18* (2013.01); *B60W 50/038* (2013.01); *G05D 1/0061* (2013.01); *G05D 1/0088* (2013.01); *B60W 2400/00* (2013.01); *B60W 2520/10* (2013.01); *B60W 2710/10* (2013.01); *B60W 2720/10* (2013.01)

(58) Field of Classification Search
CPC ...... B60W 50/12; B60W 10/04; B60W 10/10; B60W 30/00; B60W 30/18; B60W 50/038; B60W 2400/00; B60W 2520/10; B60W 2710/10; B60W 2720/10; G05D 1/0061; G05D 1/0088
See application file for complete search history.

(56) References Cited

U.S. PATENT DOCUMENTS

2008/0091314 A1\* 4/2008 Hayashi ............... B60L 7/14
701/22
2010/0256835 A1\* 10/2010 Mudalige ............. G08G 1/164
701/2
(Continued)

FOREIGN PATENT DOCUMENTS

| JP | 2016065498 A | 4/2016 |
|---|---|---|
| JP | 2016186812 A | 10/2016 |
| JP | 2017159840 A | 9/2017 |

*Primary Examiner* — Hunter B Lonsberry
*Assistant Examiner* — Elizabeth Yang
(74) *Attorney, Agent, or Firm* — Duft & Bornsen, PC

(57) ABSTRACT

A vehicle control apparatus configured to control a vehicle capable of switching between a manual drive mode for driving manually and a self-drive mode for driving autonomously. The vehicle control apparatus includes an electric control unit having a microprocessor and a memory. The microprocessor is configured to perform detecting a failure of the vehicle while traveling in the manual drive mode, and switching a drive mode from the manual drive mode to the self-drive mode when the failure is detected.

10 Claims, 4 Drawing Sheets

(51) Int. Cl.
*B60W 30/18* (2012.01)
*B60W 30/00* (2006.01)

(56) References Cited

U.S. PATENT DOCUMENTS

2017/0043788 A1* 2/2017 Cullinane ............... B60R 22/48
2019/0118800 A1* 4/2019 Cho ..................... B60W 20/50

* cited by examiner

VEHICLE CONTROL APPARATUS FOR SWITCHING FROM A MANUAL DRIVE MODE TO SELF-DRIVE MODE

CROSS-REFERENCE TO RELATED APPLICATION

This application is based upon and claims the benefit of priority from Japanese Patent Application No. 2018-009758 filed on Jan. 24, 2018, the content of which is incorporated herein by reference.

BACKGROUND OF THE INVENTION

Field of the Invention

This invention relates to a vehicle control apparatus configured to control a vehicle with a self-drive function.

Description of the Related Art

Conventionally, an apparatuses is known that detects various vehicle problems (failures), determines based on detected failure whether vehicle speed needs to be restricted, and controls vehicle speed to a limit speed when restriction of vehicle speed is determined to be necessary. Such an apparatus is described, for example, in Japanese Unexamined Patent Publication No. 2016-065498 (JP2016-065498A).

However, when vehicle speed is restricted as by the apparatus set out in JP2016-065498A, vehicle behavior sometimes changes undesirably. It is usually difficult for the driver to deal appropriately with change in vehicle behavior in such situations.

SUMMARY OF THE INVENTION

An aspect of the present invention is a vehicle control apparatus configured to control a vehicle capable of switching between a manual drive mode for driving manually and a self-drive mode for driving autonomously, the vehicle including an actuator for traveling. The vehicle control apparatus includes an electric control unit having a microprocessor and a memory. The microprocessor is configured to perform: detecting a failure of the vehicle while traveling in the manual drive mode; and switching a drive mode from the manual drive mode to the self-drive mode when the failure is detected.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
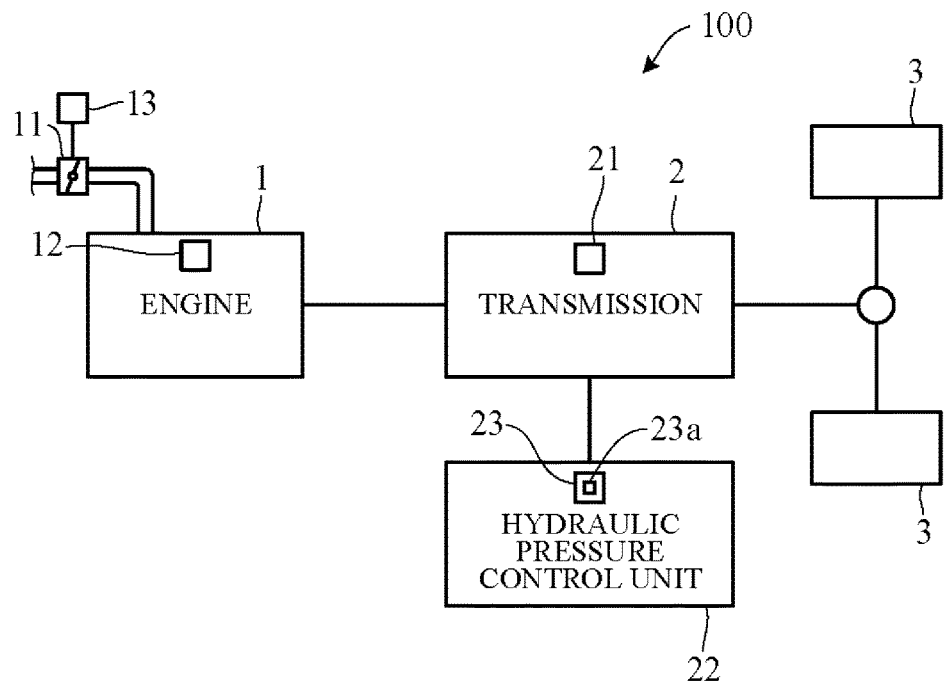
FIG. 1 is a diagram showing a configuration overview of a driving system of a self-driving vehicle to which a vehicle control apparatus according to an embodiment of the present invention is applied.

Hereinafter, an embodiment of the present invention is explained with reference to FIGS. 1 to 6. A vehicle control apparatus according to an embodiment of the present invention is applied to a vehicle (self-driving vehicle) having a self-driving capability. First, a configuration of the self-driving vehicle is explained. FIG. 1 is a diagram showing a configuration overview of a driving system of a self-driving vehicle 100 incorporating a vehicle control apparatus according to the present embodiment. Herein, the self-driving vehicle may be sometimes called "subject vehicle" to differentiate it from other vehicles. The vehicle 100 is not limited to driving in a self-drive mode requiring no driver driving operations but is also capable of driving in a manual drive mode by driver operations.

As shown in FIG. 1, the vehicle 100 includes an engine 1 and a transmission 2. The engine 1 is an internal combustion engine (e.g., gasoline engine) wherein intake air supplied through a throttle valve and fuel injected from an injector are mixed at an appropriate ratio and thereafter ignited by a sparkplug or the like to burn explosively and thereby generate rotational power. A diesel engine or any of various other types of engine can be used instead of a gasoline engine. Air intake volume is metered by the throttle valve. An opening angle of the throttle valve 11 (throttle opening angle) is changed by a throttle actuator 13 operated by an electric signal. The opening angle of the throttle valve 11 and an amount of fuel injected from the injector 12 (injection timing and injection time) are controlled by a controller 40 (FIG. 2).

The transmission 2, which is installed in a power transmission path between the engine 1 and drive wheels 3, varies speed ratio of rotation of from the engine 1, and converts and outputs torque from the engine 1. The rotation of speed converted by the transmission 2 is transmitted to the drive wheels 3, thereby propelling the vehicle 100. Optionally, the vehicle 100 can be configured as an electric vehicle or hybrid vehicle by providing a drive motor as a drive power source in place of or in addition to the engine 1.

The transmission 2 is, for example, a stepped transmission enabling stepwise speed ratio (gear ratio) shifting in accordance with multiple (e.g. six) speed stages. Optionally, a continuously variable transmission enabling stepless speed ratio shifting can be used as the transmission 2. Although omitted in the drawings, power from the engine 1 can be input to the transmission 2 through a torque converter. The transmission 2 can, for example, incorporate a dog clutch, friction clutch or other engaging element 21. A hydraulic pressure control unit 22 can shift speed stage of the transmission 2 by controlling flow of oil to the engaging element 21. The hydraulic pressure control unit 22 includes a shift actuator 23 having a solenoid valve or other valve mechanism 23a operated by electric signals, and an appropriate speed stage can be implemented by changing flow of hydraulic pressure to the engaging element 21 in response to operation of the shift actuator 23.

Figure 2:
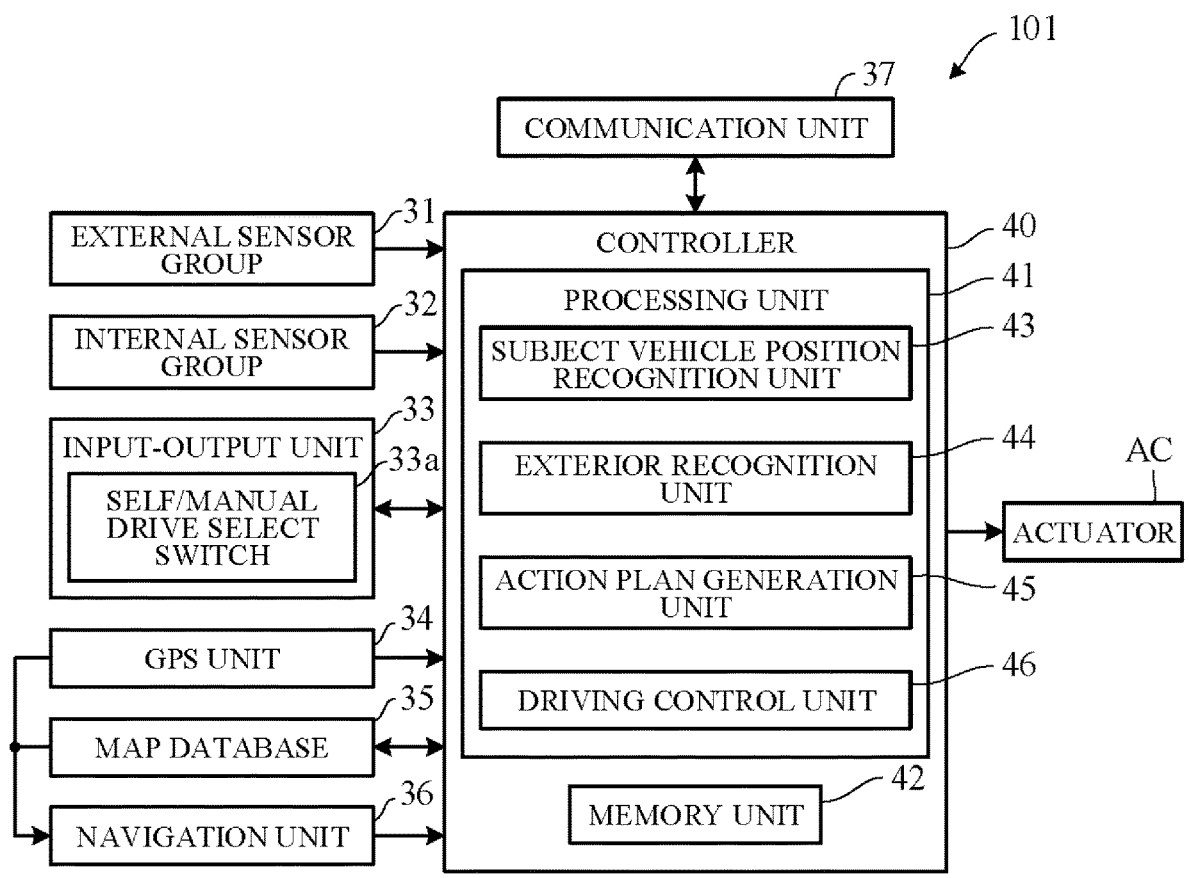
FIG. 2 is a block diagram schematically illustrating overall configuration of a self-driving vehicle system for controlling the self-driving vehicle of FIG. 1.

FIG. 2 is a block diagram schematically illustrating basic overall configuration of a self-driving vehicle system 101 for controlling the self-driving vehicle 100 of FIG. 1. As shown in FIG. 2, the self-driving vehicle system 101 includes mainly of the controller 40, and as members communicably connected with the controller 40 through CAN (Controller Area Network) communication or the like, an external sensor group 31, an internal sensor group 32, an input-output unit 33, a GPS unit 34, a map database 35, a navigation unit 36, a communication unit 37, and actuators AC for traveling.

The term external sensor group 31 herein is a collective designation encompassing multiple sensors (external sensors) for detecting external circumstances constituting subject vehicle ambience data. For example, the external sensor group 31 includes, inter alia, a LIDAR (Light Detection and Ranging) for measuring distance from the vehicle to ambient obstacles by measuring scattered light produced by laser light radiated from the subject vehicle in every direction, a RADAR (Radio Detection and Ranging) for detecting other vehicles and obstacles around the subject vehicle by radiating electromagnetic waves and detecting reflected waves, and a CCD, CMOS or other image sensor-equipped onboard cameras for imaging subject vehicle ambience (forward, reward and sideways).

The term internal sensor group 32 herein is a collective designation encompassing multiple sensors (internal sensors) for detecting subject vehicle driving state. For example, the internal sensor group 32 includes, inter alia, a vehicle speed sensor for detecting subject vehicle running speed, acceleration sensors for detecting subject vehicle forward-rearward direction acceleration and lateral acceleration, respectively, an engine speed sensor for detecting engine rotational speed, a yaw rate sensor for detecting rotation angle speed around a vertical axis through subject vehicle center of gravity, and a throttle opening sensor for detecting throttle opening angle. The internal sensor group 32 also includes sensors for detecting driver driving operations in manual drive mode, including, for example, accelerator pedal operations, brake pedal operations, steering wheel operations and the like.

The term input-output unit 33 is used herein as a collective designation encompassing apparatuses receiving instructions input by the driver and outputting information to the driver. For example, the input-output unit 33 includes, inter alia, switches which the driver uses to input various instructions, a microphone which the driver uses to input voice instructions, a display for presenting information to the driver via displayed images, and a speaker for presenting information to the driver by voice. In FIG. 2, as an example of various switches constituting the input-output unit 33, a self/manual drive select switch 33a for instructing either self-drive mode or manual drive mode is shown.

The self/manual drive select switch 33a, for example, is configured as a switch manually operable by the driver to output instructions of switching to the self-drive mode enabling self-drive functions or the manual drive mode disabling self-drive functions in accordance with operation of switching. Further, switching from manual drive mode to self-drive mode or from self-drive mode to manual drive mode is instructed even when a predetermined condition is satisfied without operation of switching. In other words, drive mode can be switched automatically not manually in response to automatic switching of the self/manual drive select switch 33a.

The GPS unit 34 includes a GPS receiver for receiving position determination signals from multiple GPS satellites, and measures absolute position (latitude, longitude and the like) of the subject vehicle based on the signals received from the GPS receiver.

The map database 35 is a unit storing general map data used by the navigation unit 36 and is, for example, implemented using a hard disk. The map data include road position data and road shape (curvature etc.) data, along with intersection and road branch position data. The map data stored in the map database 35 are different from high-accuracy map data stored in a memory unit 42 of the controller 40.

The navigation unit 36 retrieves target road routes to destinations input by the driver and performs guidance along selected target routes. Destination input and target route guidance is performed through the input-output unit 33. The destinations can be also set automatically not through the input-output unit 33. Target routes are computed based on subject vehicle current position measured by the GPS unit 34 and map data stored in the map database 35.

The communication unit 37 communicates through networks including the Internet and other wireless communication networks to access servers (not shown in the drawings) to acquire map data, traffic data and the like, periodically or at arbitrary times. Acquired map data are output to the map database 35 and/or memory unit 42 to update their stored map data. Acquired traffic data include congestion data and traffic light data including, for instance, time to change from red light to green light.

The actuators AC are provided to perform driving of the vehicle 100. The actuators AC include a throttle actuator 13 for adjusting opening angle of the throttle valve of the engine 1 (throttle opening angle), a shift actuator 23 for changing speed stage of the transmission 2 by controlling oil flow to the engaging element 21, a brake actuator for operating a braking device, and a steering actuator for driving a steering unit.

The controller 40 is constituted by an electronic control unit (ECU). In FIG. 2, the controller 40 is integrally configured by consolidating multiple function-differentiated ECUs such as an engine control ECU, a transmission control ECU, a clutch control ECU and so on. Optionally, these ECUs can be individually provided. The controller 40 incorporates a computer including a CPU or other processing unit (a microprocessor) 41 for mainly performing a processing of self-driving, the memory unit (a memory) 42 of RAM, ROM, hard disk and the like, and Input-Output interface or other peripheral circuits not shown in the drawings.

The memory unit 42 stores high-accuracy detailed map data including, inter alia, lane center position data and lane boundary line data. More specifically, road data, traffic regulation data, address data, facility data, telephone number data and the like are stored as map data. The road data include data identifying roads by type such as expressway, toll road and national highway, and data on, inter alia, number of road lanes, individual lane width, road gradient, road 3D coordinate position, lane curvature, lane merge and branch point positions, and road signs. The traffic regulation data include, inter alia, data on lanes subject to traffic restriction or closure owing to construction work and the like. The memory unit 42 also stores a shift map (shift chart) serving as a shift operation reference, various programs for performing processing, and threshold values used in the programs, etc.

As functional configurations for self-driving, the processing unit 41 includes a subject vehicle position recognition unit 43, an exterior recognition unit 44, an action plan generation unit 45, and a driving control unit 46.

The subject vehicle position recognition unit 43 recognizes map position of the subject vehicle (subject vehicle position) based on subject vehicle position data calculated by the GPS unit 34 and map data stored in the map database 35. Optionally, the subject vehicle position can be recognized using map data (building shape data and the like) stored in the memory unit 42 and ambience data of the vehicle 100 detected by the external sensor group 31, whereby the subject vehicle position can be recognized with high accuracy. Optionally, when the subject vehicle position can be measured by sensors installed externally on the road or by the roadside, the subject vehicle position can be recognized with high accuracy by communicating with such sensors through the communication unit 37.

The exterior recognition unit 44 recognizes external circumstances around the subject vehicle based on signals from cameras, LIDERs, RADARs and the like of the external sensor group 31. For example, it recognizes position, speed and acceleration of nearby vehicles (forward vehicle or rearward vehicle) driving in the vicinity of the subject vehicle, position of vehicles stopped or parked in the vicinity of the subject vehicle, and position and state of other objects. Other objects include traffic signs, traffic lights, road boundary and stop lines, buildings, guardrails, power poles, commercial signs, pedestrians, bicycles, and the like. Recognized states of other objects include, for example, traffic light color (red, green or yellow) and moving speed and direction of pedestrians and bicycles.

The action plan generation unit 45 generates a subject vehicle driving path (target path) from present time point to a certain time ahead based on, for example, a target route computed by the navigation unit 36, subject vehicle position recognized by the subject vehicle position recognition unit 43, and external circumstances recognized by the exterior recognition unit 44. When multiple paths are available on the target route as target path candidates, the action plan generation unit 45 selects from among them the path that optimally satisfies legal compliance, safe efficient driving and other criteria, and defines the selected path as the target path. The action plan generation unit 45 then generates an action plan matched to the generated target path. An action plan is also called "travel plan".

The action plan includes action plan data set for every unit time Δt (e.g., 0.1 sec) between present time point and a predetermined time period T (e.g., 5 sec) ahead, i.e., includes action plan data set in association with every unit time Δt interval. The action plan data include subject vehicle position data and vehicle state data for every unit time Δt. The position data are, for example, target point data indicating 2D coordinate position on road, and the vehicle state data are vehicle speed data indicating vehicle speed, direction data indicating subject vehicle direction, and the like. The vehicle state data can be determined from position data change of successive unit times Δt. Action plan is updated every unit time Δt.

Figure 3:
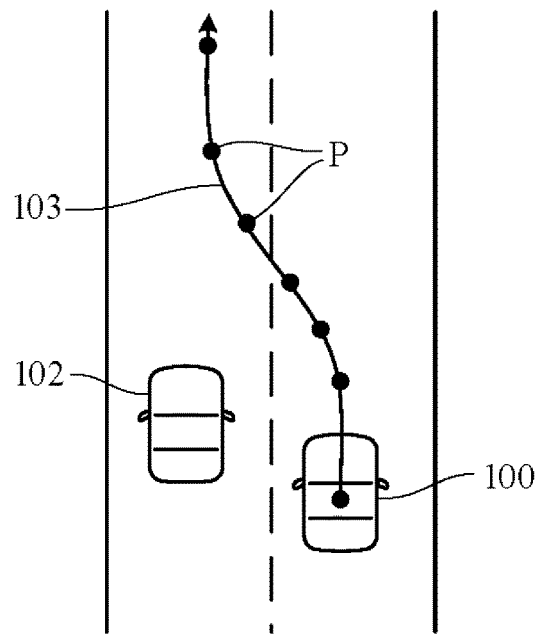
FIG. 3 is a diagram showing an example of an action plan generated by an action plan generation unit of FIG. 2.

FIG. 3 is a diagram showing an action plan generated by the action plan generation unit 45. FIG. 3 shows a scene depicting an action plan for the vehicle 100 when changing traffic lane from passing lane to regular lane after overtaking a vehicle 102 ahead. Points P in FIG. 3 correspond to position data at every unit time Δt between present time point and predetermined time period T1 ahead. A target path 103 is obtained by connecting the points P in time order. At this time, the action plan generation unit 45 calculates acceleration (target acceleration) of sequential unit times Δt based on vehicle speed (target vehicle speed) at target points of sequential unit times Δt on target path. In other words, the action plan generation unit 45 calculates target vehicle speed and target acceleration. Optionally, the driving control unit 46 can calculate target acceleration.

The action plan generation unit 45 generates not only lane-changing to move from one traffic lane to another, but also various other kinds of action plans for, inter alia, overtaking of forward vehicle, lane-keeping to maintain same lane and not stray into another, and decelerating or accelerating. When generating a target path, the action plan generation unit 45 first decides a drive mode and generates the target path in line with the drive mode. When creating an action plan for lane-keeping, for example, the action plan generation unit 45 firsts decides drive mode from among modes such as cruising, overtaking, decelerating, and curve negotiating.

In self-drive mode, the driving control unit 46 controls the actuators AC to drive the subject vehicle 100 along target path 103 generated by the action plan generation unit 45. For example, the driving control unit 46 controls the throttle actuator 13, shift actuator 23, brake actuator and steering actuator so as to drive the subject vehicle 100 through the target points P of the unit times Δt in FIG. 3.

More specifically, in self-drive mode, the driving control unit 46 calculates required driving force for achieving the target accelerations every unit time Δt calculated by the action plan generation unit 45, taking running resistance caused by road gradient and the like into account. And the actuators AC are feedback controlled to bring actual acceleration detected by the internal sensor group 32, for example, into coincidence with target acceleration. In other words, the driving control unit 46 controls actuators AC so that the vehicle 100 travels at target vehicle speed and target acceleration. On the other hand, in manual drive mode, the driving control unit 46 controls the actuators AC in accordance with driving instructions by the driver (accelerator opening angle and the like) acquired from the internal sensor group 32.

A point requiring attention here is that when, for example, the transmission 2 malfunctions during traveling of the vehicle 100 in manual drive mode with the transmission 2 in a high-speed range, vehicle speed is preferably restricted in the interest of safety such as by shifting the transmission 2 from the high-speed range (fifth speed or sixth speed) to a low-speed range or mid-speed range (e.g., third speed or lower). However, when vehicle speed is restricted owing to failure of the transmission 2 during running of the vehicle 100 at high speed in a high-speed range on an expressway, for example, a sudden change in vehicle behavior unintended by the driver occurs. This may mentally confuse the driver to the point of not being able to perform optimum driving operations in a calm mental state. The present embodiment is configured as set out in the following with consideration to this possibility.

Figure 4:
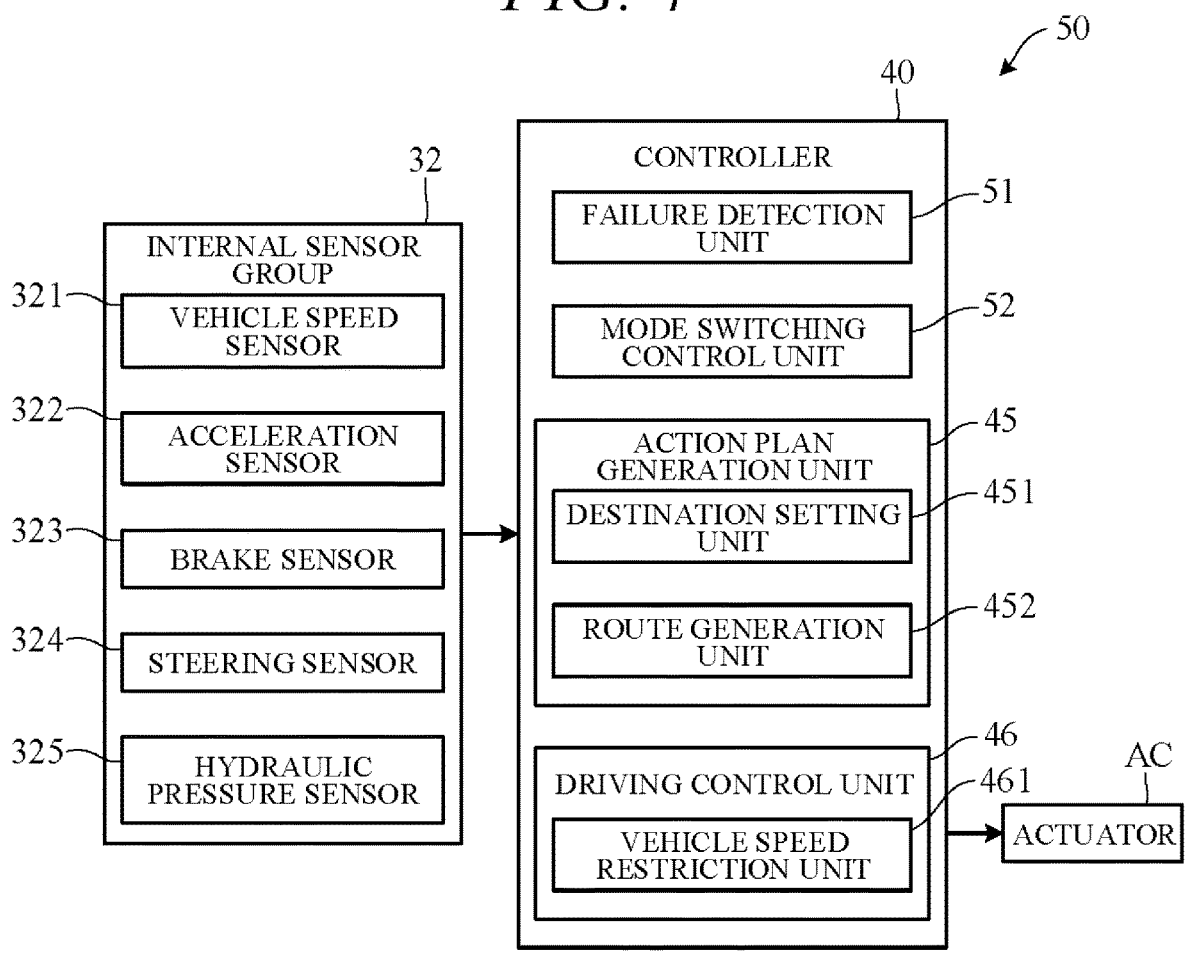
FIG. 4 is a block diagram illustrating main configuration of a vehicle control apparatus according to the embodiment of the present invention.

FIG. 4 is a block diagram showing main components of a vehicle control apparatus 50 in accordance with the present embodiment. The vehicle control apparatus 50 is for controlling traveling behavior of the vehicle 100, and while it is configured in common with the self-driving vehicle system 101 of FIG. 2 in some aspects, some parts of the self-driving vehicle system 101 are omitted in FIG. 4.

The vehicle control apparatus 50 according to the present embodiment is involved in control of vehicle 100 when a problem of the vehicle 100 is detected. Problems of the vehicle 100 are of various kinds occurring at different locations and differing in nature. In the following, a case of failure of the transmission 2 is taken up as an example. More specifically, as an example is considered a case in which a problem of sticking or the like occurs in the valve mechanism 23a installed in the hydraulic pressure control unit 22 for controlling flow of pressure oil to the engaging elements 21.

As shown in FIG. 4, the vehicle control apparatus 50 includes the controller 40, the internal sensor group 32 whose individual members are connected to the controller 40, and actuators AC.

The internal sensor group 32 includes a vehicle speed sensor 321 for detecting vehicle speed, an acceleration sensor 322 for detecting amount of accelerator pedal depression (accelerator opening angle) by the driver, a brake sensor 323 for detecting amount of brake pedal operation by the driver, a steering sensor 324 for detecting position of a steering wheel operated by the driver, and a hydraulic pressure sensor 325 for detecting hydraulic force varied by operation of the valve mechanism 23a provided in the hydraulic pressure control unit 22. When the valve mechanism 23a operates normally, hydraulic force detected by the hydraulic pressure sensor 325 falls within a predetermined range dependent on a speed range instruction. When the valve mechanism 23a experiences sticking or other failure, detected hydraulic force falls outside the predetermined range.

As functional configurations, the controller 40 includes a failure detection unit 51, a mode switching control unit 52, the action plan generation unit 45, and the driving control unit 46.

The failure detection unit 51 determines whether or not the transmission 2 fails based on a signal from the hydraulic pressure sensor 325. More specifically, the failure detection unit 51 compares a signal (detected hydraulic pressure value) from the hydraulic pressure sensor 325 when a shift instruction is output by the controller 40 with a hydraulic pressure threshold corresponding to the shift instruction, determines whether difference between the detected value and the threshold falls within a predefined range, and thus determines whether sticking or other failure occurs in the valve mechanism 23a. Thresholds corresponding to shift instructions are, inter alia, stored in the memory unit 42 (FIG. 2) in advance.

The vehicle 100 is also susceptible to numerous failures other than sticking of the valve mechanism 23a of the transmission 2, including, for example, electrical system and sensor signal failure affecting shift actuator driving, electrical system and sensor signal failure affecting clutch actuator driving, transmitted torque decrease failure owing to clutch disk overheating, failure owing to overheating of drive circuits caused by increase in frequency of shift actuator and clutch actuator operation, and failure caused by overheating of lubrication and coolant oils. The failure detection unit 51 is also adapted to detect these failures by comparing signals from sensors of the internal sensor group 32 with predefined thresholds associated with the sensors.

The mode switching control unit 52 switches drive mode from manual drive mode to self-drive mode based on signals from the vehicle speed sensor 321 and failure detection unit 51. Specifically, when, during running in manual drive mode, vehicle speed V detected by the vehicle speed sensor 321 is equal to or greater than a limit speed Va stored in the memory unit 42 in advance, and failure such as of the transmission 2 is detected by the failure detection unit 51, the mode switching control unit 52 determines that automatic switch condition is satisfied and switches drive mode form manual drive mode to self-drive mode.

Even after drive mode is switched to self-drive mode in response to automatic switch condition being satisfied, the mode switching control unit 52 switches drive mode from self-drive mode back to manual drive mode when vehicle speed V detected by the vehicle speed sensor 321 is less than limit speed Va and predetermined automatic restore condition is satisfied. In other words, drive mode is automatically returned to manual drive mode. In order to inhibit sudden change of vehicle behavior when drive mode switches from self-drive mode to manual drive mode, automatic restore condition is deemed to be satisfied only when all of first condition to third condition set out below are simultaneously satisfied.

First condition is that difference between calculated (virtual) accelerator opening angle corresponding to required driving force when traveling in self-drive mode and concurrent accelerator opening angle owing to driver operation detected by the acceleration sensor 322 is equal to or less than predetermined value. Second condition is that difference between deceleration of the vehicle 100 when traveling in self-drive mode and concurrent deceleration corresponding to amount of brake pedal operation owing to driver operation detected by the brake sensor 323 is equal to or less than predetermined value. Third condition is that difference between steering angle when traveling in self-drive mode and concurrent steering angle owing to driver operation detected by the steering sensor 324 is equal to or less than predetermined value. When the aforesaid first to third conditions are in established state, drive mode can be switched from self-drive mode to manual drive mode. In other words, automatic restore condition is satisfied when differences between drive instructions for actuator AC from the driver detected by sensors of the internal sensor group 32 in manual drive mode and drive instructions for actuator AC from the driving control unit 46 in self-drive mode are equal to or less than predetermined values.

The action plan generation unit 45 includes a destination setting unit 451 and a route generation unit 452 as functional configurations. The destination setting unit 451 sets a safe emergency destination when drive mode is automatically switched from manual drive mode to self-drive mode by the mode switching control unit 52 in response to failing of the vehicle 100. Destination is set with consideration to current location of the vehicle 100, nature of the failure and other factors, to a suitable place where interference with surrounding traffic is minimal.

If speed of the vehicle 100 should be restricted because of a failure occurring while running on an expressway, for example, the vehicle 100 must leave the expressway onto an ordinary road in order to avoid interfering with flow of surrounding traffic. In such a case, the destination setting unit 451 sets destination to a nearby interchange (exit), for example. When setting an interchange as destination is inadvisable because, for example, the nearest interchange is too far away, the destination setting unit 451 instead sets a parking area, service area or the like as destination. When speed of the vehicle 100 is restricted because of a failure occurring while running on an ordinary road, the destination setting unit 451 sets destination to a place where the vehicle 100 can be inspected and/or repaired, such as a nearby dealer or an auto repair shop.

When the destination setting unit 451 sets a destination during traveling in self-drive mode, the route generation unit 452 generates a traveling route from current location toward the designated destination. The traveling route is, for example, generated with consideration to individual road speed regulations so as prevent the speed-restricted vehicle 100 from interfering with traffic owing to its speed V being far below legal speed. When the vehicle 100 is restricted to speed of 50 km/h, for example, a road or roads whose legal speed limits are no higher than 50 km/h are preferentially selected and used to generate the traveling route. Optionally, in order to enable the vehicle 100 to run to the destination efficiently, the traveling route can be generated taking traffic congestion and the like into consideration.

The driving control unit 46 includes a vehicle speed restriction unit 461 as a functional configuration. When the mode switching control unit 52 responds to failing of the vehicle 100 (e.g., failure of the transmission 2) by automatically switching drive mode from manual drive mode to self-drive mode or from self-drive mode to manual drive mode, the vehicle speed restriction unit 461 controls actuators AC so as to restrict maximum vehicle speed to predefined value Va (limit speed). For example, the vehicle speed restriction unit 461 outputs a control signal to the shift actuator 23 to shift the transmission 2 from high-speed range to low-speed range. As a result, the vehicle 100 can be controlled after failing so as to restrict maximum vehicle speed during self-drive mode and during manual drive mode to predetermined value Va or less. In self-drive mode, the driving control unit 46 controls actuators AC so that the vehicle 100 follows the route generated by the route generation unit 452 and arrives at the destination while restricting maximum vehicle speed.

Figure 5:
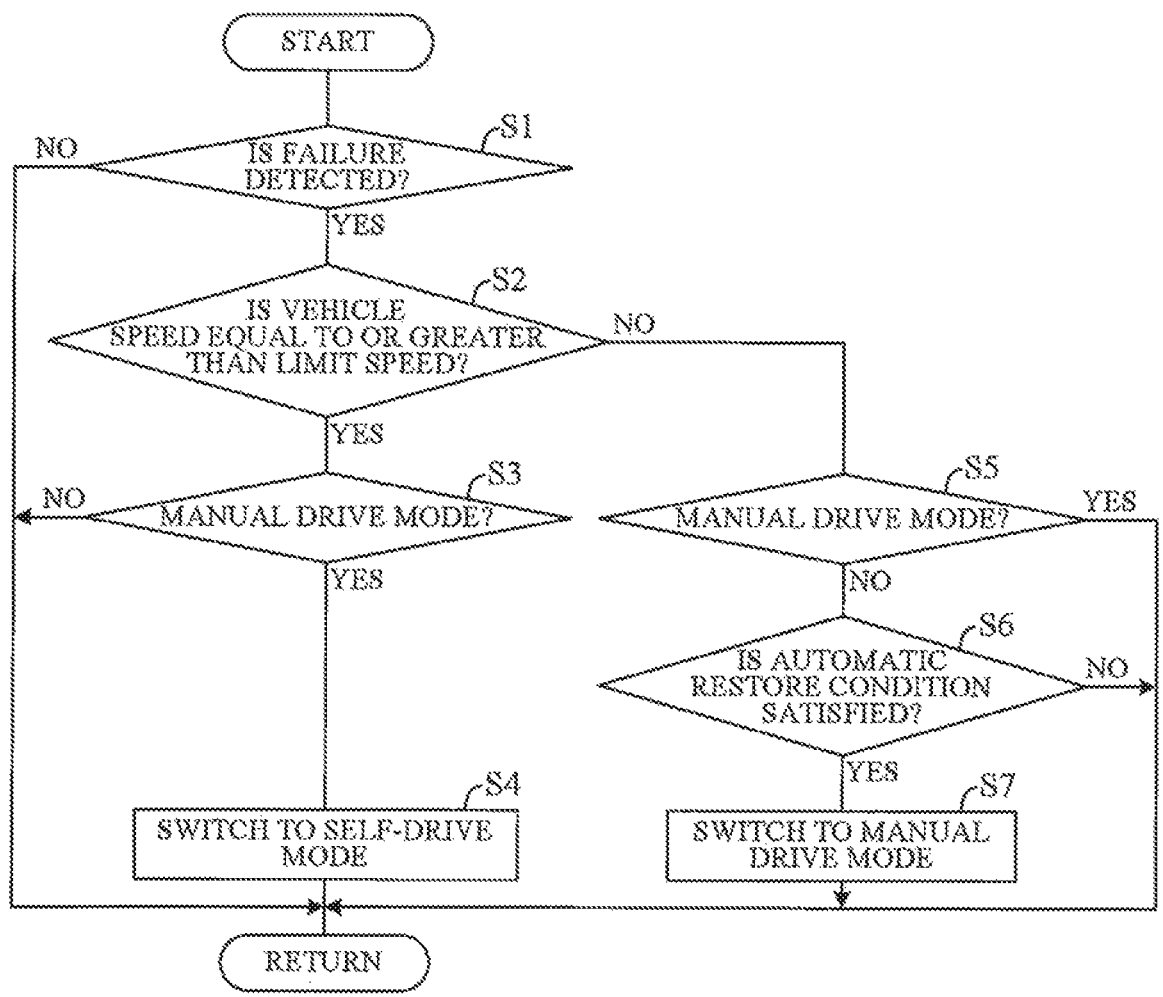
FIG. 5 is a flow chart showing an example of processing performed by a controller of FIG. 4.

FIG. 5 is a flowchart showing an example of processing performed by the CPU of the controller 40 of FIG. 4 in accordance with a program stored in the memory unit 42 in advance, particularly an example of processing related to drive mode switching. The processing shown in this flowchart is repeatedly performed at predetermined intervals.

First, in S1 (S: processing Step), the failure detection unit 51 determines based on a signal from the hydraulic pressure sensor 325 whether the transmission 2 fails. If a positive decision is made in S1, the routine proceeds to S2, and if a negative decision is made, returns to S1. In S2, whether vehicle speed V detected by the vehicle speed sensor 321 is equal to or greater than limit speed Va is determined. If a positive decision is made in S2, the routine proceeds to S3 to determine whether drive mode is manual drive mode. If a positive decision is made in S3, the routine proceeds to S4, and if a negative decision is made, returns to S1. In S4, the mode switching control unit 52 switches drive mode from manual drive mode to self-drive mode, whereafter the program returns to S1.

On the other hand, if a negative decision is made in S2, the routine proceeds to S5 to determine whether drive mode is manual drive mode. If a negative decision is made in S5, the routine proceeds to S6, and if a positive decision is made, returns to S1. In S6, whether the automatic restore condition is satisfied is determined. Namely, it is determined whether differences between drive instructions for the actuator AC corresponding to amounts of accelerator pedal, brake pedal and steering wheel operation under manual driving and the corresponding drive instructions for the actuator AC under self-driving are all equal to or less than predetermined values. If a positive decision is made in S6, the routine proceeds to S7, and if a negative decision is made, returns to S1. In S7, the mode switching control unit 52 switches drive mode from self-drive mode to manual drive mode, whereafter the program returns to S1.

Figure 6:
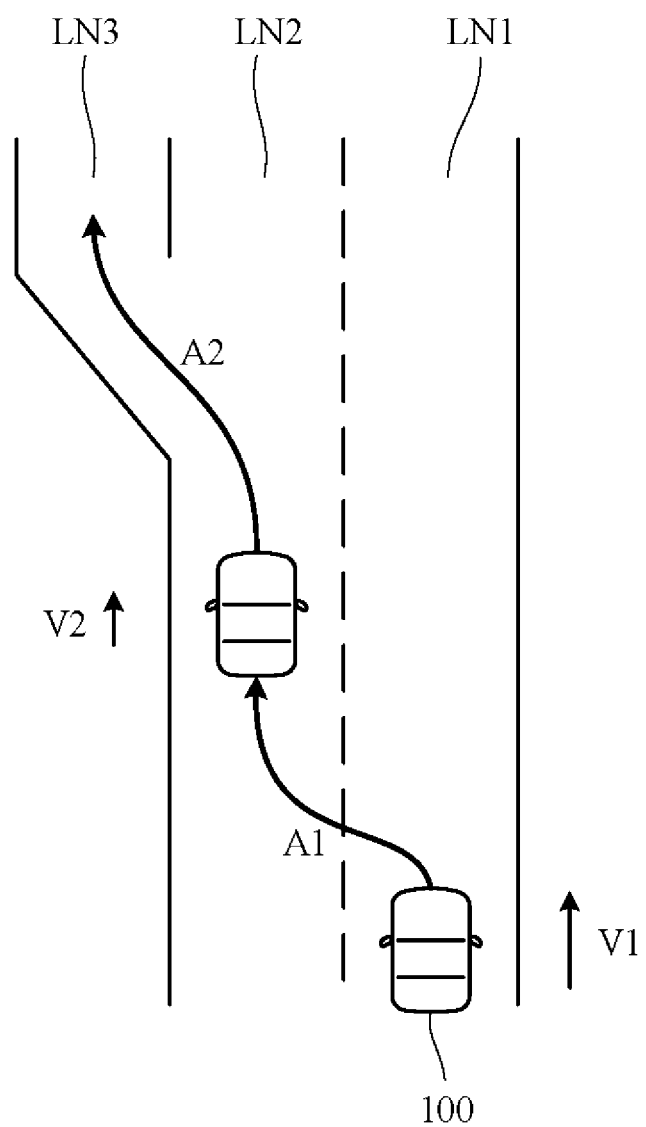
FIG. 6 is a diagram showing an example of an action by the vehicle control apparatus according to the embodiment of the present invention.

Main operation of the vehicle control apparatus 50 according to the present embodiment is more concretely explained in the following. Assume first that, as shown in FIG. 6, the vehicle 100 is running in passing lane LN1 of a left-side-traffic expressway in high-speed range at vehicle speed V1 of or faster than limit speed Va. Further assume that while running in this state the failure detection unit 51 detects a failure caused by sticking of the valve mechanism 23a. Upon detecting this failure, drive mode is switched to self-drive mode (S1→S2→S3→S4). This results in the transmission 2 being shifted to a certain low-speed range or mid-speed range, thereby limiting vehicle speed to limit speed Va or slower.

Once drive mode is switched to self-drive mode, the destination setting unit 451 sets a nearby interchange as destination and the route generation unit 452 generates routes A1 and A2 to the destination. Insofar as differences at this time between drive instructions for the actuator AC under self-driving and drive instructions for the actuator AC under manual driving are greater than predetermined values, self-driving is continued (S2→S5→S6), without automatic restore condition being satisfied. In other words, manual driving operations by a driver are ignored.

The vehicle 100 therefore automatically travels along routes A1 and A2 in a vehicle speed restricted condition with vehicle speed V restricted to limit speed Va or slower (e.g., to vehicle speed V2). Specifically, the vehicle 100 runs while monitoring surrounding circumstances using, inter alia, suitable members of the external sensor group 31 so as to move from passing lane LN1 to regular (inside) lane LN2 (follow route A1) and further change from regular lane LN2 to deceleration lane LN3 (follow route A2) in order to leave the expressway and move onto an ordinary road. The vehicle 100 can therefore automatically travel along suitable routes even in situations involving vehicle speed restriction leading to changes in vehicle behavior that might hinder the driver from performing driving actions in a calm mental state.

If the vehicle 100 reaches a thoroughly decelerated state as it approaches its destination (e.g., an interchange toll gate) while running in deceleration lane LN3 and, in addition, differences between drive instructions for the actuator AC under self-driving and drive instructions for the actuator AC under manual driving decrease, indicating that automatic restore condition is satisfied, drive mode is switched to manual drive mode (S6→S7). As a result, behavior changes of the vehicle 100 can be minimized and drive mode can be smoothly moved to manual drive mode. Following this, the vehicle 100 is driven in manual drive mode in accordance with operations by a driver while being subjected to vehicle speed restriction.

When the driver fails to perform any driving actions notwithstanding that the vehicle 100 has approached the destination by self-driving, the driver is preferable prompted to perform suitable driving operations by a voice or other instruction notified through the input-output unit 33. When the driver still does not perform appropriate driving operations in spite of such an instruction, the vehicle 100 can optionally be stopped at a safe location after or before passing its destination. Another option is to set a new destination for the vehicle 100 and run the vehicle toward the new destination by self-driving at restricted vehicle speed.

The present embodiment can achieve advantages and effects such as the following:

(1) The vehicle control apparatus 50 is configured to control the vehicle 100, which is capable of switching between manual drive mode for driving manually and self-drive mode for driving autonomously. The vehicle control apparatus 50 includes the failure detection unit 51 for detecting failure of the vehicle 100 while running in manual drive mode and the mode switching control unit 52 for switching drive mode from manual drive mode to self-drive mode when the failure detection unit 51 detects failure of the vehicle (FIG. 4).

Since drive mode therefore automatically switches from manual drive mode to self-drive mode when the vehicle 100 fails, the vehicle 100 can autonomously drive suitably with consideration to the malfunction even if the driver should perform an improper driving operation, and can, for example, autonomously drive to a preset destination while staying in a vehicle speed restricted state. The vehicle 100 can therefore travel appropriately regardless of driver proficiency or mental condition. Moreover, since the driver is not required to drive manually while concerned that the vehicle 100 may have suffered a failure, mental stress on a driver driving in manual drive mode can be mitigated.

(2) The vehicle control apparatus 50 further includes the action plan generation unit 45 responsive to drive mode being switched from manual drive mode to self-drive mode by the mode switching control unit 52 when the failure detection unit 51 detects failure of the vehicle 100, for generating an action plan including a destination matched to the nature of failure of the vehicle 100 and a route to the destination, and the driving control unit 46 for controlling traveling activity of the vehicle 100 in accordance with the action plan generated by the action plan generation unit 45 (FIG. 4). Since a destination of the vehicle 100 and a route to the destination are automatically set in this manner when the vehicle 100 fails, the vehicle 100 can travel appropriately in self-drive mode.

(3) The vehicle control apparatus 50 further includes the vehicle speed sensor 321 for detecting vehicle speed V and the vehicle speed restriction unit 461 for restricting vehicle speed V to limit speed Va when the failure detection unit 51 detects failure of the vehicle (FIG. 4). The mode switching control unit 52 is responsive to detection of failure of the vehicle 100 by the failure detection unit 51 when vehicle speed V detected by the vehicle speed sensor 321 is equal to or greater than limit speed Va, for switching drive mode from manual drive mode to self-drive mode (S3→S4), and responsive to detection of failure of the vehicle 100 by the failure detection unit 51 when vehicle speed V detected by the vehicle speed sensor 321 is less than limit speed Va, for maintaining drive mode in manual drive mode (S2→S5). Even if vehicle speed is restricted when the vehicle 100 fails, behavior of the vehicle 100 does not change insofar as vehicle speed V is equal to or less than limit speed Va from the beginning. Since switching to self-drive mode is not performed in such a case, the driver can easily continue manual driving as up to then and can be protected from experiencing odd sensations regarding driving operations.

(4) The mode switching control unit 52 is responsive to vehicle speed V detected by the vehicle speed sensor 321 falling below limit speed Va after drive mode is switched from manual drive mode to self-drive mode upon detection of failure of the vehicle 100 by the failure detection unit 51, for enabling switching of drive mode from self-drive mode to manual drive mode. Namely, the fact that vehicle speed V falls below desired vehicle speed Va is defined as one condition to be satisfied, and when the automatic restore condition is satisfied, drive mode is restored from self-drive mode to manual drive mode (FIG. 5). As drive mode is therefore automatically restored to manual drive mode at a time when the driver can comfortably drive manually, driver satisfaction is high. A key point here is that in a case where the vehicle 100 travels in manual drive mode from the start, the driver is likely to feel dissatisfied with even a short-term switch to self-drive mode and feel a desire to resume driving in manual drive mode. A good way to satisfy this driver desire is therefore to automatically restore manual drive mode once predetermined conditions are satisfied.

Various modifications of the aforesaid embodiment are possible. Some examples are explained in the following. In the aforesaid embodiment, when the transmission 2 fails, maximum vehicle speed is restricted to limit speed Va or slower by prohibiting use of high-speed range. In other words, operation of the transmission 2 is regulated to large speed ratio, but it is possible instead to restrict operation of other equipment and restrict aspects other than vehicle speed. For example, when overheat failure of a battery, overheat failure of a travel motor or similar is detected, propulsion motor output can be lowered in order to lower travel motor or battery temperature. When failure of fuel injection system or throttle valve of the engine 1 is detected, meaning that normal engine output cannot be achieved, output of the engine 1 can be restricted. When failure of the engine itself is detected, vehicle travel by the engine can be prohibited and traveling by travel motors implemented. When high temperature failure of ATF is detected, vehicle speed can be restricted in order to lower oil temperature by avoiding oil temperature rise region. When overheat failure of a start-off clutch or the like is detected, upper limit torque (driving force) can be restricted in order to lower clutch transfer torque. In other words, the failure detection unit can be of any configuration.

In the aforesaid embodiment, the mode switching control unit 52 restores drive mode to manual drive mode when vehicle speed V falls to or below limit speed Va and predetermined automatic restore condition is satisfied, but the mode switching control unit is not limited to the aforesaid configuration and it is alternatively possible to restore drive mode to manual drive mode solely on condition of vehicle speed falling to or below limit speed. Moreover, automatic restore condition is not limited to those set forth in the foregoing.

The present invention can also be used as a vehicle control method configured to control a vehicle capable of switching between a manual drive mode for driving manually and a self-drive mode for driving autonomously.

The above embodiment can be combined as desired with one or more of the above modifications. The modifications can also be combined with one another.

According to the present invention, since a drive mode is automatically switched to self-drive mode when a failure of a vehicle is detected during traveling in manual drive mode, it is possible to drive the vehicle appropriately regardless of proficiency or mental condition of a driver.

Above, while the present invention has been described with reference to the preferred embodiments thereof, it will be understood, by those skilled in the art, that various changes and modifications may be made thereto without departing from the scope of the appended claims.

What is claimed is:

1. A vehicle control apparatus configured to control a vehicle capable of switching between a manual drive mode for driving manually and a self-drive mode for driving autonomously, the vehicle including an actuator for traveling, a power source, drive wheels, and a transmission installed in a power transmission path transmitting power from the power source to the drive wheels, the vehicle control apparatus comprising:

a vehicle speed detector configured to detect a vehicle speed; and an electric control unit having a microprocessor and a memory, wherein the microprocessor is configured to perform:

determining whether the transmission of the vehicle traveling in the manual drive mode fails;

increasing a speed ratio of the transmission to restrict the vehicle speed to a predetermined vehicle speed if it is determined that the transmission of the vehicle traveling in the manual drive mode fails; and switching a drive mode from the manual drive mode to the self-drive mode if it is determined that the transmission of the vehicle traveling in the manual drive mode fails when the vehicle speed detected by the vehicle speed detector is equal to or greater than the predetermined vehicle speed, while maintaining the drive mode in the manual drive mode even if it is determined that the transmission of the vehicle traveling in the manual drive mode fails when the vehicle speed detected by the vehicle speed detector is less than the predetermined vehicle speed.

2. The apparatus according to claim 1, wherein the microprocessor is configured to further perform:

generating an action plan including a destination in accordance with a nature of a failure of the transmission and a route to the destination upon the drive mode being switched from the manual drive mode to the self-drive mode after it is determined that the transmission of the vehicle traveling in the manual drive mode fails; and controlling the actuator in accordance with the action plan.

3. The apparatus according to claim 1, wherein the microprocessor is configured to perform the switching including returning the drive mode from the self-drive mode to the manual drive mode upon a predetermined condition including a condition that the vehicle speed detected by the vehicle speed detector becomes less than the predetermined vehicle speed is satisfied, after switching the drive mode from the manual drive mode to the self-drive mode according to a determination that the transmission of the vehicle traveling in the manual drive mode fails.

4. The apparatus according to claim 3, wherein the predetermined condition further includes a condition that a difference between a first instruction value for the actuator instructed by a driver in the manual drive mode and a second instruction value for the actuator in the self-drive mode is equal to or less than a predetermined value.

5. A vehicle control method configured to control a vehicle capable of switching between a manual drive mode for driving manually and a self-drive mode for driving autonomously, the vehicle including an actuator for traveling, a power source, drive wheels, and a transmission installed in a power transmission path transmitting power from the power source to the drive wheels, the vehicle control method comprising:

detecting a vehicle speed;

determining whether the transmission of the vehicle traveling in the manual drive mode fails;

increasing a speed ratio of the transmission to restrict the vehicle speed to a predetermined vehicle speed if it is determined that the transmission of the vehicle traveling in the manual drive mode fails; and switching a drive mode from the manual drive mode to the self-drive mode if it is determined that the transmission of the vehicle traveling in the manual drive mode fails, when the vehicle speed detected is equal to or greater than the predetermined vehicle speed, while maintaining the drive mode in the manual drive mode even if it is determined that the transmission of the vehicle traveling in the manual drive mode fails when the vehicle speed detected is less than the predetermined vehicle speed.

6. The method according to claim 5, further comprising:

generating an action plan including a destination in accordance with a nature of a failure of the transmission and a route to the destination upon the drive mode being switched from the manual drive mode to the self-drive mode after it is determined that the transmission of the vehicle traveling in the manual drive mode fails; and controlling the actuator in accordance with the action plan generated.

7. The method according to claim 5, wherein the switching includes returning the drive mode from the self-drive mode to the manual drive mode upon a predetermined condition including a condition that the vehicle speed detected becomes less than the predetermined vehicle speed is satisfied, after switching the drive mode from the manual drive mode to the self-drive mode according to a determination that the transmission of the vehicle traveling in the manual drive mode fails.

8. The method according to claim 7, wherein the predetermined condition further includes a condition that a difference between a first instruction value for the actuator instructed by a driver in the manual drive mode and a second instruction value for the actuator in the self-drive mode is equal to or less than a predetermined value.

9. The apparatus according to claim 1, further comprising;

a hydraulic pressure sensor configured to detect a hydraulic pressure of an oil supplied for shifting of the transmission, the microprocessor is configured to perform the determining including determining that the transmission of the vehicle traveling in the manual drive mode fails when the hydraulic pressure detected by the hydraulic pressure sensor falls outside a predetermined range.

10. The method according to claim 5, further comprising;

detecting a hydraulic pressure of an oil supplied for shifting of the transmission, wherein the determining includes determining that the transmission of the vehicle traveling in the manual drive mode fails when the hydraulic pressure detected falls outside a predetermined range.

* * * * *